Patented Mar. 11, 1941

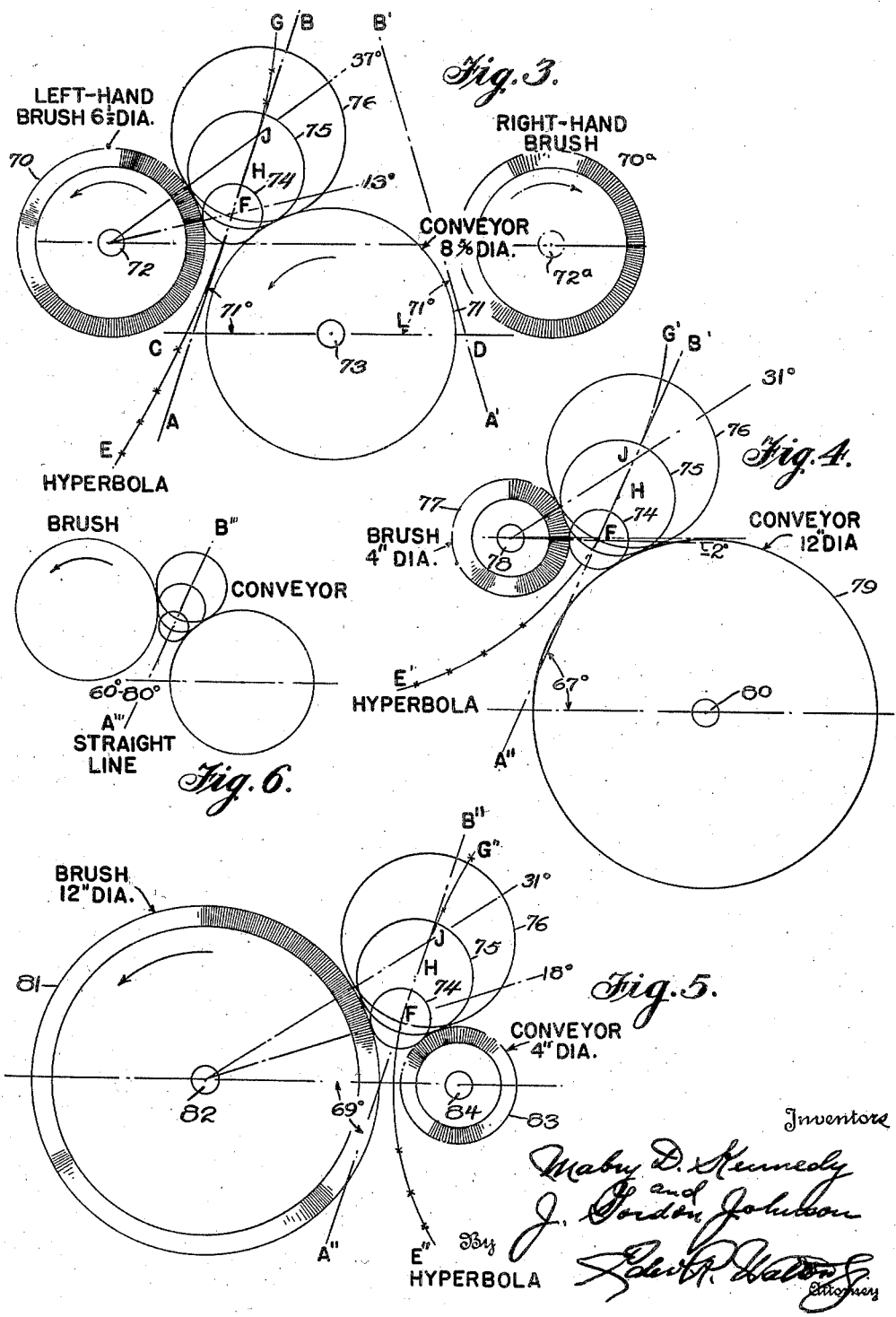

2,234,766

UNITED STATES PATENT OFFICE 2,234,766

BRUSHING MACHINE FOR ROLLABLE OBJECTS

Mabry D. Kennedy and John Gordon Johnson, Orlando, Fla., assignors to American Machinery Corporation, Orlando, Fla., a corporation of Florida Application February 23, 1939, Serial No. 259,059

7 Claims. (Cl. 146—202)

The invention relates to a machine for washing, drying, and polishing articles having a substantially spherical shape, particularly citrus fruit.

As is well known, such fruit is of very diverse sizes ranging from six inches or so in diameter for grapefruit down to approximately an inch for limes, and with wide variations even for each specific kind of citrus fruit.

An object of the invention is to provide a single machine which will handle all these different sizes of fruit without requiring any adjustments or changes in the mechanism, this machine preferably comprising a number of similar but relatively independent units.

Specifically, each unit of the present invention consists of two or three rolls, which revolve in the proper directions to cause the fruit to feed along the rolls while being thoroughly brushed and freed from adhering water in their passage along the said rolls.

The preferred unit consists of a feed roll with a brush roll arranged on each side thereof, the axes of the brush rolls usually being elevated above the axis of the feed roll and all the rolls having their axes parallel to one another.

A feature of the invention resides in arranging the said rolls in proper relative position to one another to prevent the fruit under treatment from being thrown out of the machine, and this is accomplished by such positioning of the rolls as is mentioned in the preceding sentence.

In the accompanying drawings a preferred form of the machine is illustrated. In said drawings:

Fig. 3 is a diagram illustrating suitable relative positions of the brush roll and the conveyor or feed roll for a specific instance wherein the conveyor roll and the somewhat larger brush roll do not differ greatly from one another in diameter.

Fig. 4 is a diagram similar to Fig. 3 wherein the conveyor roll is assumed to be much greater in diameter than the brush roll.

Fig. 5 is a diagram similar to Fig. 3 wherein the conveyor roll on the contrary is much smaller in diameter than the brush roll, and Fig. 6 is a diagram similar to Fig. 3 wherein the conveyor roll and the brush roll are of substantially the same diameter.

In all the views, similar elements are indicated by the same reference characters.

Figure 1:
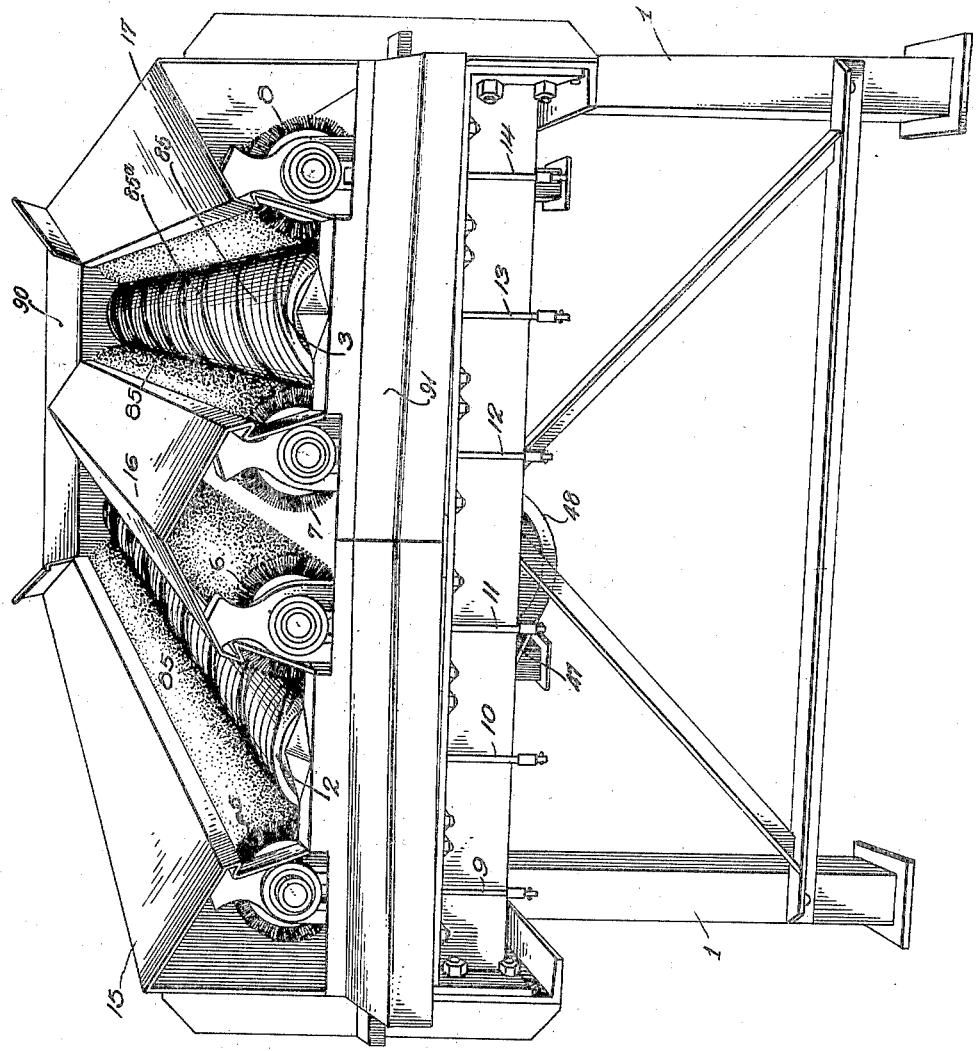
Fig. 1 is a perspective view of a machine comprising two units, each unit consisting of a feed roll and two brush rolls, the said view showing the discharge end of the machine, in the foreground.

Referring first to Fig. 1, it will be seen that the machine consists of a support or framework 1 carrying the two conveyor rolls 2 and 3 and the four brush rolls 5, 6, 7, and 8 respectively. The conveyor rolls 2 and 3 have preferably firm or solid faces of substantially water-non-absorbing material and these surfaces have, preferably but not necessarily, spiral indentations 85 therein. These rolls 2 and 3 may comprise corrugated metal cylinders, the corrugations, forming the indentations 85, being oblique with respect to the axes of the rolls to feed the fruit from one end thereof to the other. In addition to the relatively shallow corrugations, or in lieu thereof, a slightly deeper spiral rib 85a may be provided having its convolutions wider apart than the corrugations 85. These corrugations 85 or spiral 85a are, preferably, not deep or high enough to have the fruit become pocketed therein. The brush rolls are, preferably, cylindrical and are not grooved or spiralled but have a substantially unbroken brushing surface. Lubricator means 9, 10, 11, 12, 13, and 14 of well known commercial types may be provided for the shafts carrying the various rolls above mentioned. Sheet metal or other suitable deflectors 15, 16, and 17 are preferably provided, partly covering the respective brush rolls so that water or other material thrown off by the bristles thereof will strike the under surfaces of such deflectors and will thus be prevented from being thrown out of the machine in an upward direction.

Figure 2:
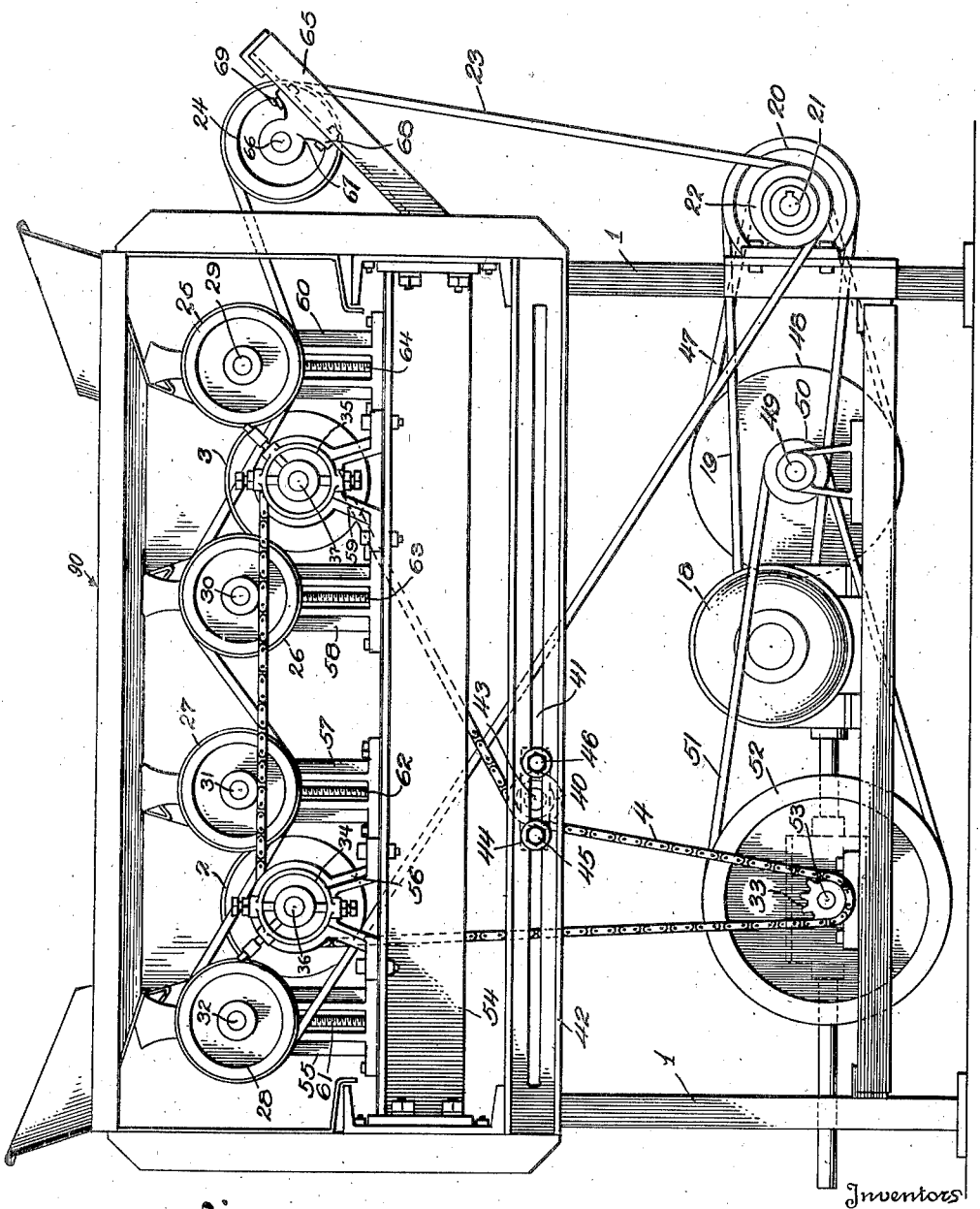
Fig. 2 is an end elevation of the machine, as seen from the fruit-receiving end thereof.

Referring now more particularly to Fig. 2, it will be noted that the entire mechanism preferably is driven by a single motor 18 through the belt 19, which by means of pulley 20 drives the counter-shaft 21 carrying pulley 22, then partly through belts 23 and partly through the sprocket chain 4, which drive certain rolls directly.

Pulley 22 is preferably of the multiple V-groove type and a suitable number of V-belts 23 passes over said pulley 22, then over the idler 24 and thence alternately under and over the pulleys 25, 26, 27, and 28 respectively so as to drive said pulleys alternately in opposite directions. Pulley 25 drives the shaft 29 which carries the brush roll 5; pulley 26 similarly drives the shaft 30 upon which is mounted the brush roll 6; pulley 27 drives the shaft 31 of brush roll 7; and pulley 28 similarly rotates the shaft 32 of the brush roll 8.

The chain 4 passes over the sprocket gear 33 which drives it and the sprocket wheels 34 and 35 secured to the shafts 36 and 37 respectively, which drive the conveyor rolls 2 and 3. An additional sprocket wheel 40 is provided to take up slack in the chain 4. This sprocket wheel 40 is adjustable along a slot 41 formed in one of the structural elements of the frame 1, here shown as I-beam 42. The sprocket wheel 40 is carried upon a stub shaft 43 mounted on a carriage 44 secured to the I-beam 42 by means of the bolts 45 and 46, whereby the carriage 44 may be secured firmly in any of its adjusted positions along the slot 41.

The sprocket chain 4 is moved by the same motor 18, namely, from the counter-shaft 21, a belt 47 engaging a suitable pulley on said counter-shaft drives the pulley 48 mounted on shaft 49 which carries also the pulley 50. Belt 51 passes over pulley 50 and pulley 52, which it drives and which is secured to shaft 53, which carries also the sprocket wheel 33. It will be noted, however, that the speed of the chain 4 is much lower than the speed of the belts 23 because of the various pulleys interposed between shaft 53 and shaft 21, which are so relatively dimensioned as to provide the said desired speed reduction.

The various shafts 29, 30, 31, 32, 36 and 37 are supported on structural members or beams such as 54, being mounted thereon and carried by suitable journals 55, 56, 57, 58, 59 and 60, respectively. The screw-threaded members 61, 62, 63, and 64 may be provided for the purpose of making it possible to adjust the vertical elevations of the shafts 32, 31, 30, and 29 respectively, so that it thus becomes possible to adjust the heights of the brush rolls with respect to the conveyor rolls.

The shaft 66 upon which the idler pulley 24 is mounted is carried by a suitable journal or pedestal 67 mounted so as to be adjustable along an arm or beam 65, which extends at a slant from one end of the frame 1. The journal 67 may be secured to the structural member 65 by means of bolts 68 and 69 cooperating with a slot in the member 65, thus permitting the pulley 24 to be shifted to the proper position to take up the slack in the belts and then to be secured firmly by the bolts 68 and 69.

It will be understood that, referring to Fig. 1, the fruit or other material to be treated by the machine is introduced thereto at the rearward end and progressively moves forward along the feed rolls 2 and 3 while the brush rolls 5, 6, 7, and 8 are simultaneously in contact with the said material, the brushes revolving much faster than the conveyors or feed rolls. In accordance with the present invention it has been found that the axes of the brush rolls preferably are elevated somewhat above those of the conveyor rolls to avoid having the fruit or the like thrown out of the machine.

If the substantially spherical material, such as fruit, is disposed in contact with one of the brush rolls and with the co-acting conveyor roll, it will be obvious that the center of each article or fruit may be used as a reference point in speaking of the relations between the rolls. Obviously, such center points will lie in a straight line parallel to the axes of brush roll and conveyor roll for all spheres of any given size. For the range of sizes of fruit commercially concerned, it has been found that within a reasonable degree of approximation the center points of all the various fruits when disposed in contact with brush roll and conveyor roll will lie approximately in a single plane. There is a certain deviation between this plane and the mathematically plotted center points of the fruit, but such deviation is unimportant within the ranges of size involved, particularly in view of the fact that the actual fruit is not a true sphere but merely an approximate sphere so that nice mathematical calculations are not involved here.

Reference to Fig. 3 will show the conditions in question clearly. In this figure one specific instance is illustrated, wherein the brush roll 70 is 6½ inches in diameter and the conveyor roll 71 is 8⅝ inches in diameter. Here satisfactory operation is obtained when the axis 72 of the brush roll is elevated sufficiently above the axis 73 of the conveyor roll, and also placed far enough horizontally to one side thereof, to bring the line AB which passes through the centers F, H and J of the fruits 74, 75 and 76 to an angle of substantially 71° with the line CD which passes horizontally through the axis 73 of the conveyor roll. These fruits are for example two inches, four inches and six inches in diameter, and these sizes are given solely for purposes of illustration.

At this point it may be desirable to go somewhat into the mathematics involved in the placing of the said rolls. It will be understood, of course, that the line AB is merely the intersection of the plane, which approximately contains the centers of the various sizes of fruit, with the plane of the paper so that AB really is the end view of said plane. The actual curve which would be obtained instead of the straight line AB by plotting the circles such as 74, 75 and 76 tangential to the circles 70 and 71 representing the brush and conveyor respectively, would be one branch of a hyperbola, EFG.

It is obvious that the center points of the fruit such as F, H, J, are so related to the points 72 and 73, representing the intersections of the axis of the rolls with the plane of the paper, that the difference between the distance 72F and 73F is the same as the difference between the distance 72H and 73H and also the same as the difference between the distance 72J and 73J and so on, in other words the points lying on the curve EFHJG are all so related to the points 72 and 73 that the difference of their distances from these two points remains constant. Now, one well-known definition of a hyperbola is that it is a curve which is traced by a point moving so that it maintains a constant difference of distance from two given fixed points, which constitute the foci of the hyperbola.

One branch of the hyperbola is here drawn as curve EFG, although it will be understood that there is another branch, with its concavity turned in the opposite direction, but this has not been shown, as it is of no interest here. In fact, only a portion of the upper half of the branch E, F, G is concerned here in any way and even this is approximated by the straight line AFB which, it will be seen from the drawing, practically coincides with the hyperbola within the range F, H, J, which represents the above-mentioned commercial sizes of fruits. This line leans toward the conveyor roll and when extended so as to cross the line CD here makes an angle of 71° and this has been found to be a suitable angle to be made by the plane containing the centers of the fruit with the horizontal to prevent the fruit from being thrown out of the machine while it is in operation.

It will be understood that while only the left hand brush roll is considered specifically in Figs. 3 to 6 nevertheless exactly the same considerations apply of course to the right hand brush roll, which has been indicated at 70a in Fig. 3, with its axis at 72a. For this brush roll 70a in combination with the conveyor roll 71, a corresponding line $A_1B_1$ applies, this line being at the same angle as line AB to the horizontal line CD, but inclined of course in the opposite direction. Ordinarily the right and left hand brushes will be of the same diameter, but this is not essential, and is merely a matter of convenience and ease of manufacture. The upper surfaces of the brushes should turn so as to move away from the conveyor, as indicated by the arrows in the various figures. The conveyor may turn in either direction, but its helical corrugations should be so arranged as to assist in feeding the articles in the desired direction.

Fig. 4 is similar to Fig. 3 but is intended to show that it is not necessary to adhere to any given relative or absolute dimensions of either the brush or the conveyor. In this figure the brush 77 having the axis 78 is arbitrarily made four inches in diameter while the conveyor 79 having the axis 80 is made twelve inches in diameter. Three fruits 74, 75, and 76 of the same illustrative sizes as those shown in Fig. 3, are here indicated in contact with the brush and conveyor rolls and again the line A'B' similar to line AB of Fig. 3, is found to lean toward the conveyor roll and to make an angle of approximately the same value, here 67° for the best commercial effect. The hyperbola E'G' corresponding to the hyperbola EG passes through the center points F, H, and J of the articles shown and here again it is seen that through this range there is no appreciable deviation between the hyperbola and the straight line A'B'.

Turning next to Fig. 5 the case is shown wherein the brush 81 with the axis 82 is arbitrarily made twelve inches in diameter while the conveyor 83 with the axis 84 is chosen only four inches in diameter. In this instance the two axes 82 and 84 are approximately in the same horizontal plane, that is, it is here not necessary to elevate the brush roll above the conveyor roll, as in the other forms. Here again the different sizes of fruit 74, 75 and 76 having their centers at F, H, and J are illustrated as in contact with the two rolls and the line A"B" makes an angle of 69° with the horizontal line passing through the axes 82 and 84 of the rolls. The true hyperbola is shown at E", F, H, G" and as before the points F, H and J lie very closely in the line A"B" which here leans toward the conveyor roll and makes an angle of 69° with the horizontal.

These three figures have been introduced not in any limiting sense, to confine the inventive idea to definite sizes of rolls, but on the contrary to illustrate what a great diversity of arbitrary sizes is possible. Without designing to confine the angle made by the line AB and the corresponding lines in the other figures, it will be noted in general that satisfactory operation is obtained within the range extending some ten degrees to each side of 69° so that an angle reasonably close to 69° in one direction or the other will give satisfactory operation, that is, it will allow the machine to be operated at its optimum speed without any tendency to throw fruit out of the machine or damage it.

In the instance where the brush and conveyor rolls are identical in size as illustrated in Fig. 6, it is clear that instead of being a hyperbolic surface the correct mathematical configuration containing the centers of the fruits will be a plane. In this limiting case where the brush and conveyor are equal in diameter the line A'''B''' passing through the centers of the articles will likewise lean toward the conveyor roll making an angle between say 60° and 80° to the horizontal. It will be noted by comparing Fig. 6 with Figs. 3 and 4 on the one hand, and with Fig. 5 on the other hand, that where the brush is smaller in diameter than the conveyor, the hyperbola will have its concavity directed to the left, while in the case where the conveyor roll is smaller than the brush roll the concavity of the hyperbola will be directed to the right, Fig. 6 being the limiting case where the two are equal in diameter and where consequently there is no hyperbola but a true straight line.

In all the forms, however, it has been clearly shown that for a very wide range of sizes and relative arrangements of the brush roll and conveyor roll a straight line is amply adequate as a basis for design for machines for treating fruit or other nearly spherical articles of the commercially encountered sizes.

It is desirable that the peripheral speed of the brush should be much higher than the peripheral speed of the conveyor. If the peripheral speed of the brush is too low, it will not satisfactorily clean and dry the fruit because it will not produce sufficient centrifugal force to throw off the droplets of water. Obviously the speed should not be too high because excessive speed would needlessly increase the power required for operation and possibly might also cause the brushes to damage the skin of the fruit, much as a scratch brush removes particles from the surfaces of articles cleaned thereby.

Observation has shown that while a wide latitude of speeds is permissible, possibly the best results are obtained, when using a six and one-half inch brush, by running it at 1000 revolutions per minute. A speed considerably below this does not produce as satisfactory and rapid drying although speeds even as low as half this have sometimes been found adequate, depending on conditions. Obviously the upper limit of the speed, aside from considerations of possible injury to the fruit, is determined also by the power required to produce high speeds, since the power required increases very rapidly as the speed is increased so that it does not pay commercially to make the speed much higher than the lowest speed that will give uniformly satisfactory results.

The speed of the conveyor does not materially affect the operating efficiency of the machine. The conveyor speeds are usually designed in accordance with the capacity of the machine, small machines having their conveyors running not over ten to twenty revolutions per minute as a rule, while larger machines, such as those used in commercial packing houses which usually are designed to have a fruit drying capacity of one carload of fruit per day for each brush, may have their conveyors turning at the rate of about thirty to fifty revolutions per minute so as to provide such increased out-put capacity to the machine. The conveyor speeds on machines of approximately the same capacity would be the same whether the machine is used solely as a washer or as a dryer-polisher.

The brushes when used in washing machines are ordinarily made of tampico or palmetto fibre stapled into a wood block and trimmed to within one inch of the wood. The fibres ordinarily used are known commercially as "A1 grade." Dryer-polisher brushes are stapled with what is known as coarse English horse hair of the best commercial grade (actually a product which comes from China, in spite of its name) and trimmed to a length of one inch. Horse hair is usually graded commercially as fine, medium and coarse, or heavy, and sometimes designated by numbers as 50, 60, 70, and 80. In the present machines the kind known as coarse or heavy, number 70 or 80, would preferably be used. This is still somewhat lighter than would be used for ordinary polisher brushes, but it is not intended to restrict the present machine to any definite grade of brush hairs or fibres. Both fibre and hair, of course, have been used for many years in the citrus machinery field, but other materials may also be found suitable and used if preferred, without departing from the underlying principles of the invention.

In operation the articles to be cleaned and dried, for example fruit, are introduced into the machine at the far end 90, as shown in Fig. 1, whereupon the rotating conveyors, both by reason of the spiral corrugations 85 and 85a thereon and also by reason of the crowding of the articles themselves, will cause such articles to be fed forward through the machine to the discharge end 91 and in the meanwhile they are maintained in a leaning contact with the corresponding conveyor and with brush 5, 6, 7, or 8, which will result in imparting rotation to each article but the axis of such rotation will continually change as the article progresses along the groove or valley between the conveyor and the coacting brush so that all portions of the surface of the article are treated many times in the course of the traverse of the article along the conveyor and brush.

This results in removing the water and foreign material from the surface of the article, which of course has previously been wetted either by spraying or by immersion in water or some other cleaning liquid, so that practically all the water and foreign material will be removed by the brushes and the articles will be dry and ready for shipment or storage when they emerge from the forward end of the machine.

The brushes and conveyor will also usually impart a polish to the articles, particularly in the case of fruit which has a waxy or oily surface, thus greatly enhancing the appearance and salability of the fruit. By reason of the proper relative arrangement of the axes of the conveyor and cooperating brush rolls, the result is attained that the fruit is not thrown out of the machine, but the fruit passes in an orderly fashion along the rolls through the machine without the need of clean-out devices.

This is a continuation in part of the subject matter disclosed in our joint application Serial No. 709,636, filed February 3, 1934, which became Patent No. 2,149,443 on March 7, 1939.

It will be understood that while several specific embodiments have been disclosed herein this has been done solely in an illustrative sense and not by way of limitation. An important feature of the present invention is the discovery of a new principle of design, namely, that of properly relatively locating the axes of the conveyor and brush rolls in such manner as to prevent the fruit or other article from being thrown out of the machine, while yet maintaining efficient cleaning and drying conditions. The invention, therefore, is defined solely by the following.

We claim:

1. A machine for treating substantially spherical articles, which comprises a conveyor roll having a relative water-non-absorbing spiral feed surface for conveying the article along its length, and a brush roll lying substantially parallel to the conveyor roll and having an uninterrupted brushing surface spaced from the surface of the conveyor roll a distance substantially less than the diameter of the smallest article to be treated, and means for rotating said rolls at different peripheral speeds in the order of 10 to 50 R. P. M. for a conveyor roll of approximately eight and five-eighth inches in diameter and at least 500 R. P. M. for a brush roll of approximately six and one-half inches in diameter, the direction of rotation of the brush roll when observed from above being such that its surface moves away from the conveyor roll, said rolls being so positioned relatively to one another that, when lying substantially parallel in a substantially horizontal plane, their axes will be horizontally spaced and the centers of said substantially spherical articles of different sizes when in contact with both the brush and conveyor roll will lie substantially in a plane parallel to the conveyor roll and leaning toward the conveyor roll at an angle of between substantially 60° and 80° to the horizontal, whereby articles being treated will be supported by both the brush roll and the conveyor roll and bear predominantly upon the latter and not be carried over the brush roll.

2. A machine for treating spherical articles, which comprises a conveyor roll having a relative water-nonabsorbing spiral feed surface for conveying the articles to be treated along its length, and a pair of brush rolls lying substantially parallel to and one at each side of the conveyor roll, each of said brush rolls having an uninterrupted brushing surface spaced from the surface of the conveyor roll a distance substantially less than the diameter of the smallest articles to be treated, means for rotating said brush rolls at a relatively high speed sufficient to effect centrifugal dispersion therefrom of water absorbed or wiped from the articles being treated, means for rotating the conveyor roll at a speed sufficient to convey the articles along its length for a desired output, the direction of rotation of each brush roll when observed from above being such that its surface moves away from the conveyor roll, said brush rolls and conveyor roll being so positioned relatively to one another that when lying substantially parallel in a substantially horizontal plane their axes will be horizontally spaced and the centers of said spherical articles of different sizes when in contact with a brush roll and the conveyor roll will lie substantially in a plane parallel to the conveyor and leaning toward the conveyor roll at an angle of between substantially 60° and 80° to the horizontal, whereby articles being treated will be supported by both the brush roll and the conveyor roll and bear predominantly on the latter and not be carried over the brush roll.

3. In a brushing machine for brushing spherical objects of a given range of diameters, a substantially horizontal cylindrical brush having an exterior brushing surface of substantially uniform diameter, a solid surfaced rotatable conveyor roll arranged with its axis substantially parallel to the axis of the brush and spaced horizontally from the axis of the brush with its top surface below the top surface of the brush, means for rotating the brush at a relatively high peripheral speed to effect centrifugal dispersion therefrom of water absorbed or wiped from the objects being treated in a direction such that its top surface rotates away from the top of the conveyor roll, the spacing of said roll and brush being such that the center of said substantially spherical objects of different sizes when lying in contact with both the brush and conveyor roll will lie substantially in a plane parallel to the conveyor roll and leaning toward the conveyor roll at an angle of between substantially 60° and 80° to the horizontal, whereby articles being treated will bear predominantly upon the latter and not be carried over the brush roll.

4. A brushing machine as claimed in claim 3 in which a second cylindrical brush is situated at the side of the conveyor roll opposite the first brush and positioned in relation to the conveyor in a manner similar in all respects to that of the first brush, and means for rotating the second brush at a speed similar to that of the first brush and in a direction such that its top surface rotates away from the conveyor roll.

5. A brushing machine as claimed in claim 3 with means for adjusting the position of the brush to obtain and maintain the said angularity of the plane in which the said centers of the objects approximately lie.

6. In a brushing machine for brushing spherical objects of a given range of diameters, a substantially horizontal cylindrical brush having an exterior brushing surface of substantially uniform diameter, a rotatable conveyor roll having a water-non-absorbent surface and arranged with its axis substantially parallel to the axis of the brush and spaced horizontally from the axis of the brush with its top surface below the top surface of the brush, means for rotating the conveyor roll and for rotating the brush at a relatively higher peripheral speed in a direction such that its top surface rotates away from the top of the conveyor roll, the spacing of said roll and brush being such that the centers of said substantially spherical objects of different sizes when lying in contact with both the brush and conveyor roll will lie substantially in a plane parallel to the conveyor roll and leaning toward the conveyor roll at an angle of between substantially 67° and 72° to the horizontal, whereby articles being treated will bear predominantly upon the latter and not be carried over the brush roll.

7. A brushing machine as claimed in claim 6 in which a second cylindrical brush is situated at the side of the conveyor roll opposite the first brush and positioned in relation to the conveyor in a manner similar in all respects to that of the first brush, and means for rotating the second brush at a speed similar to that of the first brush and in a direction such that its top surface rotates away from the conveyor roll.

MABRY D. KENNEDY.
J. GORDON JOHNSON.